(12) United States Patent
Jackson et al.

(10) Patent No.: US 9,146,660 B2
(45) Date of Patent: Sep. 29, 2015

(54) MULTI-FUNCTION AFFINE TOOL FOR COMPUTER-AIDED DESIGN

(75) Inventors: Preston Jackson, Longmont, CO (US); Patrick Lacz, Boulder, CO (US); Paul McLean, Denver, CO (US); Brian G. Brown, Longmont, CO (US); John M. Bacus, Boulder, CO (US); Jeffrey Hauswirth, Westminster, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 962 days.

(21) Appl. No.: 13/214,984

(22) Filed: Aug. 22, 2011

(65) Prior Publication Data

US 2013/0055126 A1    Feb. 28, 2013

(51) Int. Cl.
 G06F 3/048 (2013.01)
 G06F 3/0484 (2013.01)
 G06F 3/0481 (2013.01)

(52) U.S. Cl.
 CPC ........ G06F 3/04845 (2013.01); G06F 3/04812 (2013.01)

(58) Field of Classification Search
 CPC ...... G06F 3/0486; G06F 3/0481; G06T 11/80
 USPC .......... 715/788, 799–801, 810, 856, 859–861
 See application file for complete search history.

(56) References Cited

U.S. PATENT DOCUMENTS

| | | | |
|---|---|---|---|
| 5,396,590 A * | 3/1995 | Kreegar | 715/808 |
| 5,729,673 A | 3/1998 | Cooper et al. | |
| 5,986,670 A | 11/1999 | Dries et al. | |
| 6,002,399 A | 12/1999 | Haine et al. | |
| 6,128,631 A | 10/2000 | Wallace et al. | |
| 6,133,946 A | 10/2000 | Cavallaro et al. | |
| 6,366,293 B1 | 4/2002 | Hamilton et al. | |
| 6,426,745 B1 | 7/2002 | Isaacs et al. | |
| 6,701,513 B1 | 3/2004 | Bailey | |
| 6,781,597 B1 | 8/2004 | Vrobel | |
| 6,912,293 B1 | 6/2005 | Korobkin | |
| 6,915,301 B2 | 7/2005 | Hirsch | |
| 7,092,859 B2 | 8/2006 | Wang et al. | |
| 7,096,465 B1 | 8/2006 | Dardinski et al. | |
| 7,110,005 B2 * | 9/2006 | Arvin et al. | 345/619 |

(Continued)

OTHER PUBLICATIONS

Sandee Cohen, "Visual QuickStart Guide Fireworks 4 for Windows and Macintosh", 2001, 7 pages, fireworks4.pdf.*

(Continued)

Primary Examiner — Haoshian Shih
(74) Attorney, Agent, or Firm — Sheridan Ross P.C.

(57) ABSTRACT

A computer-aided design system and method facilitates the editing of an object in a workspace of a computer aided design system. A user input indicating selection of an affine tool is received, and a user input indicating selection of the object is received. It is determined whether an additional user input is received. If it is determined that the additional user input is not received, a first set of user-activatable affine functions for manipulating the object is enabled. The first set of user-activatable affine functions includes a move function to move the object in the workspace and a resize function to resize the object. If it is determined that the additional user input is received, a second set of user-activatable functions for manipulating the object is enabled. The second set of user-activatable affine functions includes a skew function to skew the object.

21 Claims, 7 Drawing Sheets

(56) References Cited

U.S. PATENT DOCUMENTS

| | | | |
|---|---|---|---|
| 7,302,650 B1* | 11/2007 | Allyn et al. | ............... 715/859 |
| 7,475,000 B2 | 1/2009 | Cook et al. | |
| 7,496,852 B2 | 2/2009 | Eichorn et al. | |
| 7,561,164 B2 | 7/2009 | Baumberg | |
| 7,810,025 B2 | 10/2010 | Blair et al. | |
| 8,132,115 B2 | 3/2012 | Beltran et al. | |
| 8,229,715 B1 | 7/2012 | Teller et al. | |
| 8,487,889 B2 | 7/2013 | King | |
| 8,713,519 B2 | 4/2014 | Lininger | |
| 2001/0018644 A1 | 8/2001 | Schwalb et al. | |
| 2002/0018061 A1 | 2/2002 | Gantt | |
| 2003/0206169 A1 | 11/2003 | Springer et al. | |
| 2004/0175684 A1 | 9/2004 | Kaasa et al. | |
| 2004/0177085 A1 | 9/2004 | Rappaport et al. | |
| 2005/0068290 A1 | 3/2005 | Jaeger | |
| 2005/0102063 A1 | 5/2005 | Bierre | |
| 2006/0043264 A1 | 3/2006 | Sakurai | |
| 2006/0064674 A1 | 3/2006 | Olson, Jr. et al. | |
| 2006/0174568 A1 | 8/2006 | Kinoshita et al. | |
| 2006/0242164 A1 | 10/2006 | Evans et al. | |
| 2007/0084861 A1 | 4/2007 | Epstein et al. | |
| 2008/0059914 A1 | 3/2008 | Allyn et al. | |
| 2008/0086701 A1 | 4/2008 | Stokes et al. | |
| 2009/0256846 A1 | 10/2009 | Zahariev | |
| 2010/0079493 A1 | 4/2010 | Tse et al. | |
| 2010/0121614 A1 | 5/2010 | Reghetti et al. | |
| 2010/0149091 A1 | 6/2010 | Kota et al. | |
| 2010/0149189 A1 | 6/2010 | Kota et al. | |
| 2010/0149192 A1 | 6/2010 | Kota et al. | |
| 2010/0149215 A1 | 6/2010 | Kota et al. | |
| 2010/0153692 A1 | 6/2010 | Kota et al. | |
| 2010/0321391 A1 | 12/2010 | Rubin et al. | |
| 2010/0321407 A1 | 12/2010 | Mital et al. | |
| 2012/0030612 A1 | 2/2012 | Azis et al. | |
| 2012/0262458 A1 | 10/2012 | Fowler et al. | |
| 2012/0323535 A1 | 12/2012 | Teller et al. | |
| 2013/0055125 A1 | 2/2013 | Jackson et al. | |

OTHER PUBLICATIONS

"Preparing Your Visual Basic 6.0 Applications for the Upgrade to Visual Basic .NET," Microsoft Corporation, Oct. 2000, 31 pages.
"Studio Object: The Properties Window," FunctionX, Inc., May 12, 2008, pp. 1-4.
Berndt et al., "3D Modeling in a Web Browser to Formulate Content-Based 3D Queries," Web 3D 2009 Proceedings of the 14th International Conference on 3D Web Technology, 2009, 8 pages.
U.S. Appl. No. 12/986,756, filed Jan. 7, 2011, Jackson et al.
U.S. Appl. No. 13/030,276, filed Feb. 18, 2011, Jackson et al.
International Search Report and Written Opinion for International (PCT) Patent Application No. PCT/US2012/049556 mailed Oct. 29, 2012, 8 pages.
International Preliminary Report on Patentabiliity for International (PCT) Patent Application No. PCT/US2012/049556 mailed Feb. 13, 2014, 6 pages.
International Search Report for International (PCT) Patent Application No. PCT/US2012/050906, mailed Oct. 29, 2012 3 pages.
International Preliminary Report on Patentability for International (PCT) Patent Application No. PCT/US2012/050906, mailed Mar. 6, 2014 6 pages.
Official Action for U.S. Appl. No. 12/986,756, mailed Nov. 27, 2012 13 pages.
Official Action for U.S. Appl. No. 12/986,756, mailed Jul. 17, 2013 15 pages.
Official Action for U.S. Appl. No. 12/986,756, mailed Dec. 12, 2013 16 pages.
Official Action for U.S. Appl. No. 13/030,276, mailed Mar. 10, 2014 24 pages.
Official Action for U.S. Appl. No. 13/030,276, mailed Aug. 20, 2014 29 pages.
Official Action for U.S. Appl. No. 13/197,976 mailed May 22, 2013, 23 pages.
Notice of Allowance for U.S. Appl. No. 13/197,976 mailed Dec. 6, 2013, 11 pages.
Official Action for U.S. Appl. No. 13/214,962, mailed Jan. 4, 2013 18 pages.
Official Action for U.S. Appl. No. 13/214,962, mailed Jun. 4, 2013 40 pages.
Official Action for U.S. Appl. No. 13/214,962, mailed Jun. 6, 2014 25 pages.
International Search Report for International (PCT) Patent Application No. PCT/US2012/050898, mailed Jan. 31, 2013 3 pages.
International Preliminary Report on Patentability for International (PCT) Patent Application No. PCT/US2012/050898, mailed Mar. 6, 2014 8 pages.
Official Action for U.S. Appl. No. 12/986,756, mailed Mar. 15, 2013 16 pages.
Official Action for U.S. Appl. No. 12/986,756, mailed Mar. 30, 2015 20 pages.
Notice of Allowance for U.S. Appl. No. 13/030,276, mailed Jan. 26, 2015 9 pages.
Official Action for U.S. Appl. No. 13/214,962, mailed Jan. 5, 2015 27 pages.

* cited by examiner

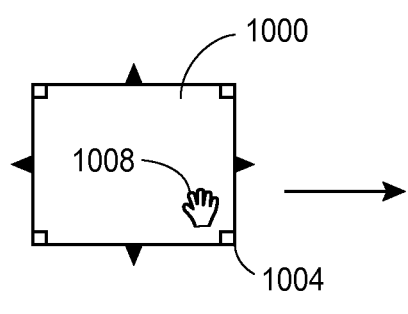
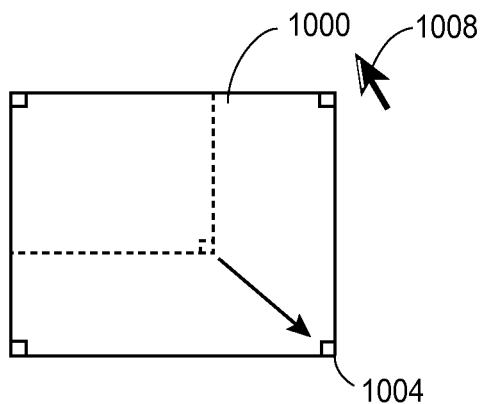
FIG. 10A   FIG. 10B
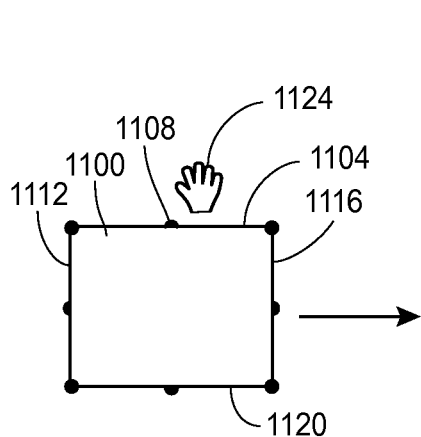
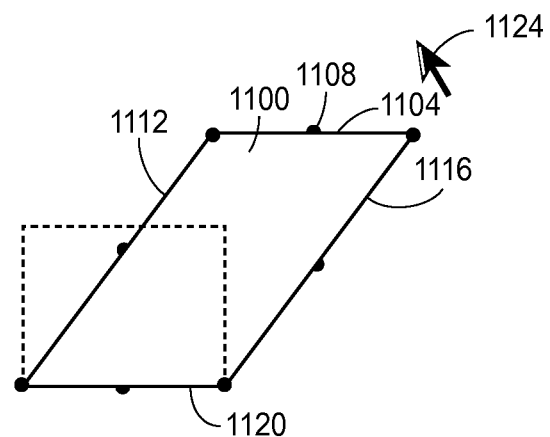
FIG. 11A   FIG. 11B
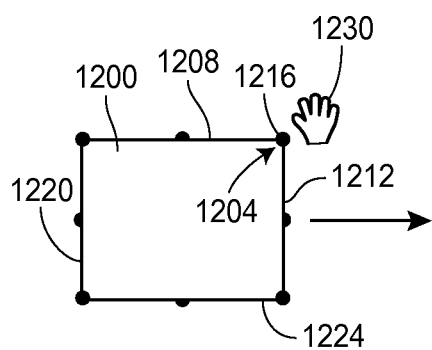
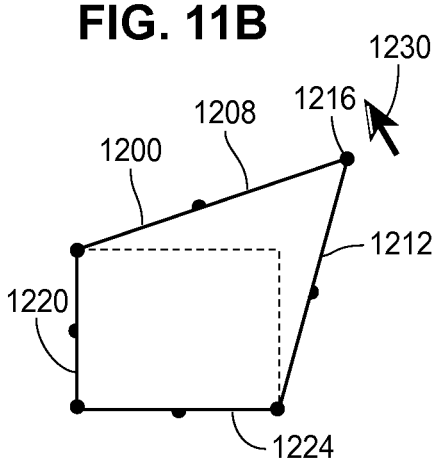
FIG. 12A   FIG. 12B

MULTI-FUNCTION AFFINE TOOL FOR COMPUTER-AIDED DESIGN

FIELD OF TECHNOLOGY

The present disclosure relates generally to tools for manipulating objects in a computer-aided design environment.

BACKGROUND

Computer-aided design (CAD) software is a computer-based graphical design tool used to aid professional and/or amateur drafters to more effectively and efficiently create two- and three-dimensional drawings and other documents with graphical content. CAD software is used in a variety of different fields, such as engineering, architecture, automotive design, graphic design, advertising, fashion design, medicine, etc. Unlike a traditional "pen and paper" drafting space, where changes to a document require erasing previous work or discarding an old document and beginning a new document, CAD software provides a graphical user interface with a virtual layout space that may be easily altered and refined as desired using a computer. Generally, a user interacts with CAD software via input devices such as a keyboard, mouse, trackball, and/or stylus. The drafting document is displayed on a graphical display device, such as a computer monitor or screen.

Most CAD software programs allow creation of a variety of objects that may be added to a layout space and used with other objects to create complex shapes and/or objects. CAD software may provide a user with stock objects such as arcs, circles, rectangles, and other known geometric shapes and/or provide tools to create such shapes. Text boxes are also available, should a user choose to insert text into a drafting document. Often, CAD software will also provide stock images to enhance a drawing. For example, an architect may wish to include exemplary landscaping in a depiction of a building and may choose to use stock images of trees, grass, and bushes. Alternatively, a user may choose to import his or her own particular images or previously-created shapes to the layout space.

The CAD software further provides a plurality of tools for manipulation of objects already in a drafting document or workspace. For example, a user may desire to relocate an object that he or she has placed in the drafting document. A "move" tool may be provided by the CAD software so that the user can move a created object within the drafting document. Alternatively, a user may desire to change the size of an object within the drafting document. Rather than requiring the user to delete and re-draw the object at a different size, a "scale" tool may be provided so that a user may re-size an object. Other types of tools that may be provided include functions such as "paint," "rotate," "skew," "move vertex," "stretch," "copy," and "paste." Buttons for invoking or selecting tools are usually provided in a "tool bar" area, which may be located along a border of the screen or the workspace, or in a movable window.

Functions such as move, rotate, stretch, scale, skew, and move vertex are examples of "affine functions." Affine functions are provided by the CAD system as tools for refining objects that have been created, placed, or imported by the user into the CAD workspace. Generally, an affine function includes a linear transformation (e.g., rotation, scaling, or skew) and/or a translation or shift (e.g., a "move"). An affine function can be represented as:

$$x \rightarrow Ax + b \qquad \text{Equ. 1}$$

where x is a vector representing an object being transformed, A is a matrix representing a linear transformation, and b is a vector representing a translation or shift. Generally, an affine function preserves 1) a collinearity relation between points (i.e., the points which lie on a line continue to be collinear after the transformation), and 2) ratios of distances along a line (i.e., for distinct collinear points p1,p2,p3, the ratio |p2−p1|/|p3−p1| is preserved).

To perform an affine function on an object, a user selects the object and then selects the proper tool for the desired manipulation of the object, or vice versa. A user may then perform the desired affine function by way of user inputs, such as clicking a mouse, touching a touch screen, dragging the object or a grip on the object, dropping the object or grip at a desired location, releasing the object or grip, entering coordinates via a keyboard, or any number of suitable input methods. Once the user has completed the desired affine function, the user may choose another tool to perform another function on the object or may choose another object on which to perform the same affine function or another affine function.

SUMMARY

In an embodiment, a method of facilitating the editing of an object in a computer aided design system may include causing a workspace to be displayed on a display device, and causing an object to be displayed in the workspace. The method also may include receiving a user input indicating selection of an affine tool, and receiving a user input indicating selection of the object. Additionally, the method may include determining whether an additional user input is received, where the additional user input is associated with affine functionality. In response to i) a user input indicating selection of the affine tool, ii) another user input indicating selection of the object, and iii) a determination that the additional user input is not received, a first set of user-activatable affine functions for manipulating the object may be enabled, wherein the first set of user-activatable affine functions includes a move function to move the object in the workspace and a resize function to resize the object. In response to i) a user input indicating selection of the affine tool, ii) another user input indicating selection of the object, and iii) a determination that the additional user input is received, a second set of one or more user-activatable affine functions for manipulating the object may be enabled, wherein the second set of one or more user-activatable affine functions includes a skew function to skew the object.

In another embodiment, one or more computer readable memories have computer executable instructions stored thereon that, when executed by one or more processors, cause the one or more processors to perform the acts of the method described in the previous paragraph.

In yet another embodiment, a computer-aided design system includes one or more processors, a display device, one or more user input devices, and one or more memory devices to store computer readable instructions that, when executed by the one or more processors, cause the processor to perform the method described in the above paragraph.

BRIEF DESCRIPTION OF THE DRAWINGS

FIG. 10A-10B shows the scale function using the scale grip.

FIG. 11A-11B shows the skew function using the skew grip.

FIG. 12A-12B shows the move vertex function using the move vertex grip.

DETAILED DESCRIPTION

In embodiments described below, a CAD system provides a single tool that permits a user to perform a plurality of different affine functions on an object in a workspace of the CAD system. For ease of explanation, references are made to the user utilizing a mouse and a pointer to create/move the snap point. However, one of ordinary skill in the art will recognize, in view of the teachings and disclosure herein, that any number of suitable input methods/devices may be employed by a user to interact with the CAD system. For example, a user may select objects, select/activate user interface items (such as buttons, grips, etc.), move objects, modify objects, etc., by providing inputs via other suitable man/machine interface devices such as a trackball, a stylus, a touch screen, a multi-touch screen, a voice command/voice recognition system, etc.

Figure 1:
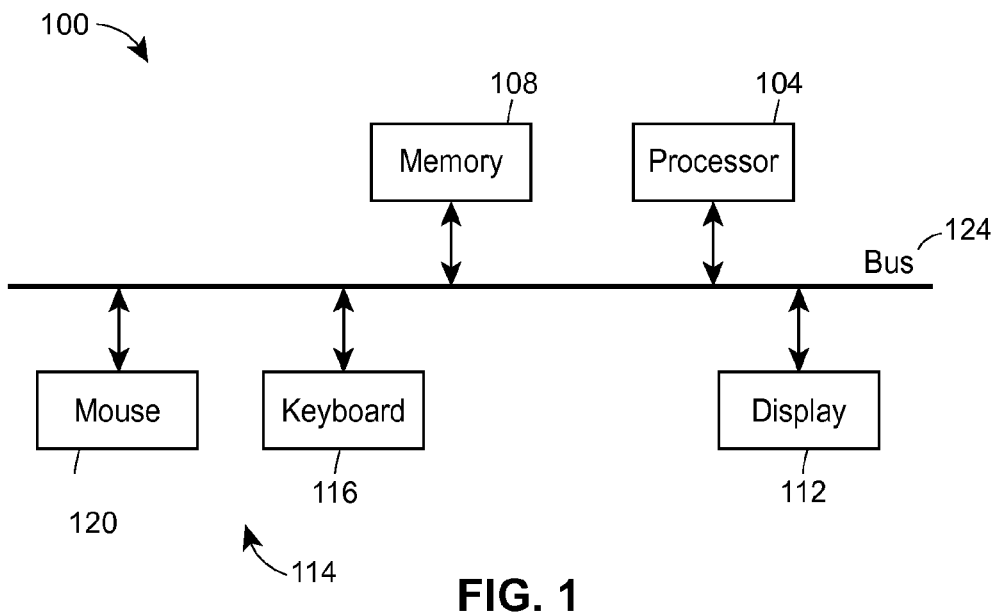
FIG. 1 is a block diagram of an example computer system that can be used to implement the CAD system.

FIG. 1 is a block diagram an example of an example computer system 100 that can be used to implement a CAD system that provides a single tool that permits a user to perform a plurality of different affine functions on an object in a workspace of the CAD system. The computer system 100 includes one or more processors 104, one or more memory devices 108, one or more display devices 112, and one or more user input devices 114 such as a keyboard 116 and a mouse 120. The one or more processors 104, the one or more memory devices 108, the display device 112, and the one or more user input devices 114 are coupled together via one or more busses 124. In other embodiments, the one or more user input devices 114 include one or more of a trackball, a stylus, a touch screen, a multi-touch screen, a voice command/voice recognition system, etc. The keyboard 116 has one or more keys for interacting with a graphical user interface provided by the CAD system, which may be displayed on the display device 112. The mouse 120 can have one or more buttons (not shown) for interacting with the graphical user interface. The one or more processors 104 execute machine readable instructions stored in the one or more memory devices 108 to implement a CAD software application. The one or more processors 104 may include one or more of a general purpose processor or a special purpose processor such as a graphics processor. The memory devices may include one or more of random access memory (RAM), read only memory (ROM), a magnetic disk, an optical disk, FLASH memory, etc.

Figure 2:
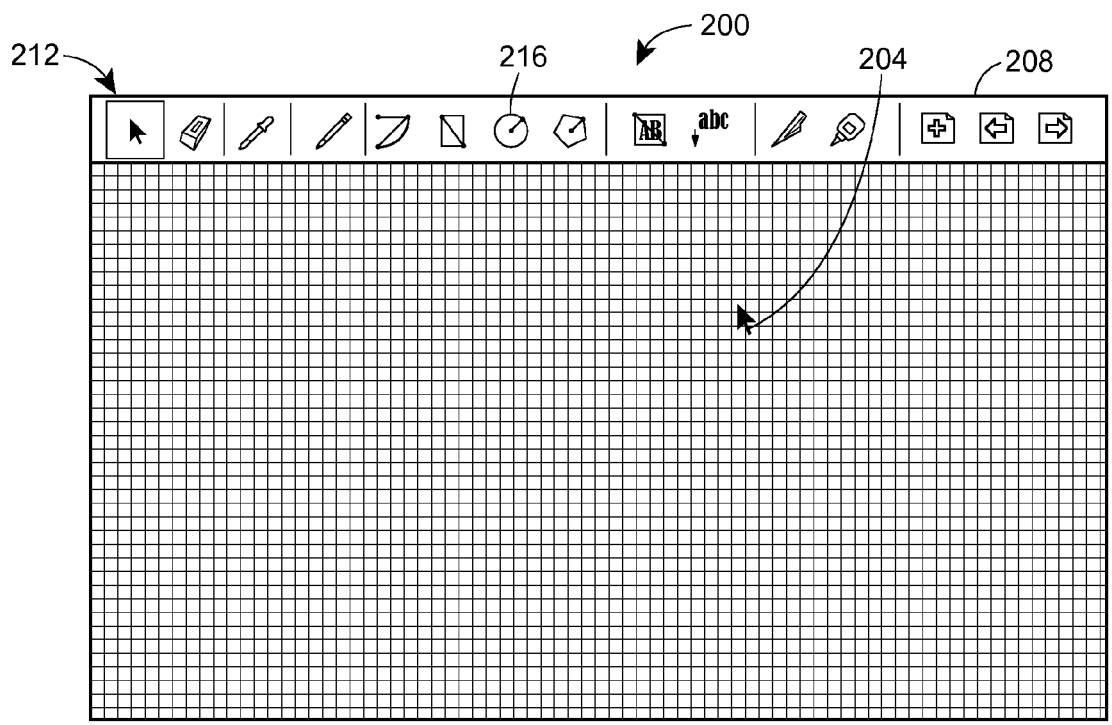
FIG. 2 is an example workspace in a CAD environment.

FIG. 2 is an example workspace 200 provided by a CAD system. The workspace 200 may be displayed on a display device such as the example display device 112 of FIG. 1. For example, the one or more processors 104 may cause the workspace 200 to be displayed on the display device 112. The workspace 200 will be described with reference to FIG. 1 for illustrative purposes. The workspace 200, however, may be utilized in conjunction with other suitable devices as well.

The workspace 200 provides a drafting area in which a user may place one or more objects for manipulation. The workspace 200 may provide a grid to allow more precise placement of objects in the workspace. For example, the placement of an object may be limited to discrete points on the grid so that an endpoint, a line segment, a corner, etc., of the object "snaps" to a grid point. Alternatively, the workspace 200 may omit the grid placement limitation, allowing the user more freedom to place objects as he or she desires. The CAD system may allow a user to specify whether or not a workspace 200 has a grid and the granularity of the grid. The grid may be visible or not visible on the workspace 200.

A user may interact with the CAD system using a cursor 204, as an example. The cursor 204 may be manipulated via a user input device, such as the mouse 120. Also, the cursor 204 may be implemented by other user input devices as well, such as a trackball, stylus, keyboard, touch screen, or any other suitable input device. As will be explained in more detail below, a cursor 204 may take on a different appearance depending on the function that is to be performed. For example, the cursor 204 may have a different appearance depending on which tool a user has selected. When the CAD system is utilized on a device with a touch screen, the cursor XX optionally may be omitted, at least in some scenarios.

The CAD system may provide a toolbar 208, shown in FIG. 2 extending along the top of the workspace 200. For example, the processor 104 may cause the toolbar 208 to be displayed on the display device 200. The toolbar 208 includes a number of different tools for creating and manipulating objects in a workspace 200. The example set of tools shown in the example toolbar 208 of FIG. 2 includes: select 212, line, arc, rectangle, circle, polygon, text, label, erase, style, split, join, start presentation, add page, previous page, and next page. Additionally, one or more of these tools may include a drop-down menu that, when selected, provides an additional listing of options. For example, create circle 216 may include a drop-down listing that provides different tools for creating a circle and for creating an ellipse. One of ordinary skill in the art will appreciate that the toolbar 208 could include any suitable number and/or variety of suitable tools. Furthermore, the toolbar 208 may be positioned in any number of suitable locations and/or orientations. For example, a similar toolbar may extend along another border of the workspace 200. Alternatively, a toolbar may be a movable window. The CAD system may allow a user to place the toolbar 208 in a desired position using the cursor 204, for example.

In some embodiments, the select tool 212 is an affine function tool 212 that allows a user to manipulate an object by performing various affine transformations such as move, resize, rotate, skew, etc.

To interact with the CAD system, a user manipulates the user input device 114 (e.g. the mouse 120) associated with the cursor 204. A user may select a desired tool from the toolbar 208 by placing the cursor 204 over the tool and selecting the tool by clicking the mouse 120, for example. The CAD system may then change the appearance of the cursor 204 so that the cursor 204 has an appearance indicative of the tool that the user has selected. For example, if the user selects a "draw" tool, the appearance of the cursor 204 may be changed to a pencil-shaped icon, indicating that the "draw" tool has been successfully selected. A user may then move the cursor 204 to perform a desired function within the workspace 200.

In some embodiments, such as with systems that utilize a touch screen, the cursor 204 may be omitted. In other embodiments utilizing a touch screen and another input device such as a mouse, the cursor 204 is included and the user moves the cursor with the mouse, but can also interact with the CAD system, such as selecting tools, selecting objects, moving objects, selecting grips, moving grips, etc., using the touch screen and without using the cursor 204.

The processor 104 implements the CAD system by executing instructions stored on the one or more memory devices 108. For example, the processor 104 causes the workspace 200 to be displayed on the display device 112. Also, the processor 104 may receive user inputs such as discussed above, via the one or more input devices 114, and may cause the appearance of the cursor 204 to change as displayed on the display device 112 in response to the user inputs. For example, the processor 104 may detect that the cursor 204 is over an object, a grip, a toolbar button, etc., and, in response, change the appearance of the cursor.

Figure 3A:
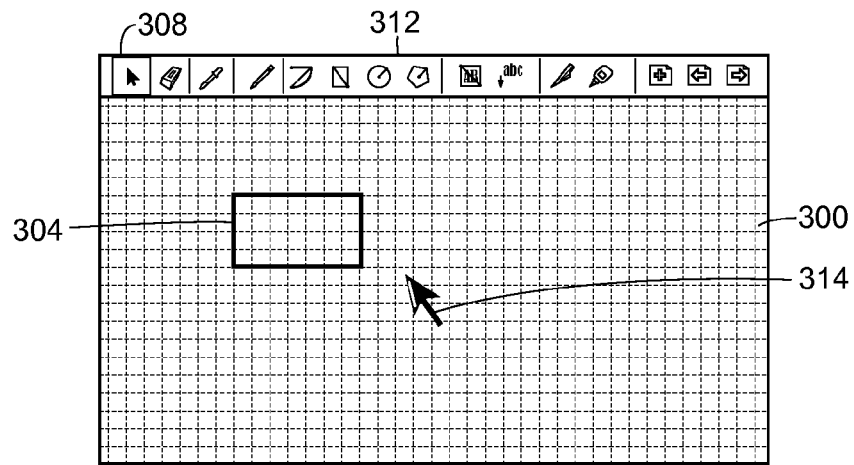
FIG. 3A-3C are examples of an object, a selected object displaying a first set of affine function grips, and a second object displaying a second set of affine grips.
Figure 3B:
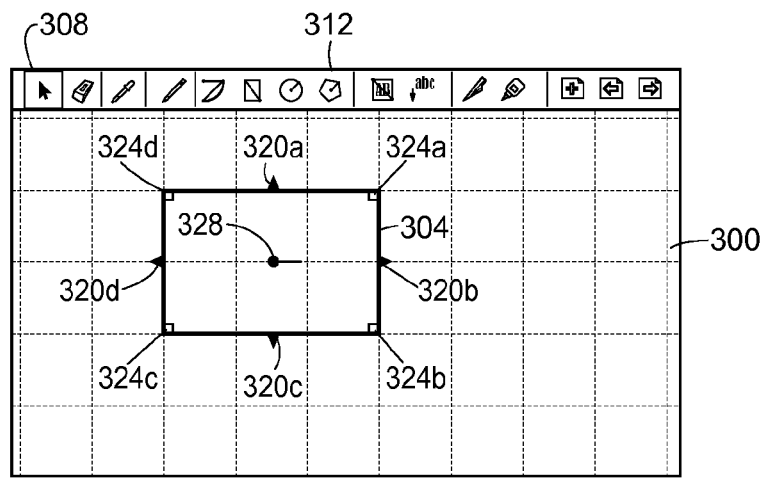
Figure 3C:
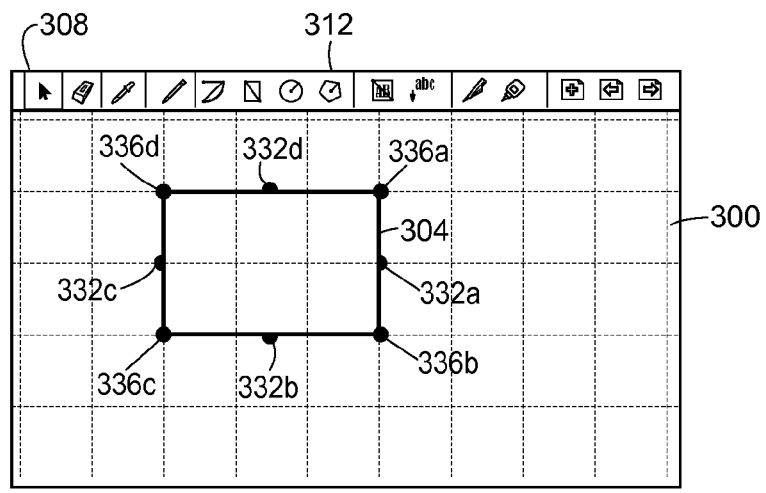

FIGS. 3A-C illustrate use of single tool that permits a user to perform a plurality of different affine functions on an object. For instance, FIG. 3A shows an example workspace 300 where a user has added an object 304. The object 304 could be added to the workspace 300 by any number of methods. For example, the object 304 could be created by the user with a tool from the toolbar 312. Alternatively, the object 304 could be imported from another application, copied from another workspace, placed using clip art, etc. FIG. 3A shows the object 304 as an unselected graphic object. To select the object 304, the user moves a cursor 314 to the object 304 and clicks on the object 304. In embodiments, that omit the cursor 314 and/or utilize a touch screen, the user may select the object 304 by touching the object 304 on a display device with a touch screen, for example.

FIG. 3B shows the object 304 after object 304 has been selected. In response to the object 304 being selected, a first set of affine grips 320, 324, 328 are displayed on the object 304. Each of the first set of affine grips 320, 324, 328 indicates that a different affine function that may be performed on an object 304 by the user. For example, the grips 320 may be used to resize the object 304 by stretching the object in one dimension. The grips 324 may be used to resize the object 304 by stretching the object in two dimensions. The grip 328 may be used to rotate the objection 304.

FIG. 3C shows the selected object 304 displaying a second set of affine grips 332, 336 associated with the affine tool 308. To display the second set of affine grips 332, 336, a user has selected the object 204 as previously described with respect to FIG. 3A, and the user may then indicate that the user would like to enable the second set of affine grips 332, 336 by providing an additional user input. In one example, the user depresses a particular key on a keyboard. Alternatively, a user may indicate via any other suitable input device, such as a mouse click, stylus depression, a touch screen input, a voice command, or any other suitable input to indicate that the user would like to utilize the second set of affine functions. In one example in which a particular keyboard key is depressed in order to utilize the second set of affine functions, during the time when the key remains depressed, the second set of affine grips 332, 336 are displayed on the object 304, indicating that the second set of affine functions are available. When the user releases the key, the second set of affine grips 332, 336 cease being displayed and the first set of affine grips 320, 324, 328 are again displayed, as shown in FIG. 3B.

In another embodiment, the key may act as a toggle as well. For example, the a user may press and release the key one time in order to enable the second set of affine grips 332, 336, as shown in FIG. 3C. When the user presses and releases the key again, the first set of affine grips 320, 324, and 328 would again be displayed, as shown in FIG. 3B.

Once the user has completed editing of the object 304 using the first set of affine grips 320, 324, 328 or the second set of affine grips 332, 336, the user may choose to select another tool, select another object, or to select no object. If another object is selected or the user selects a point on the workspace with no objects, the object 304 will become unselected. Once an object is unselected, it returns to the state of FIG. 4A and is no longer displayed with any of the affine grips of FIGS. 3B and 3C. If another tool on the toolbar 312 is selected, different grips or no grips may be displayed, depending on the selected tool and/or the particular embodiment.

Furthermore, it is possible to select more than one object at a time. In such an instance, the tool would transition into a new state where two objects are selected. The controls then extend off of the corners of the box and onto an imaginary bounding area of the two selected objects. The first and second set of affine grips would then be displayed on this imaginary boundary, indicating that the first and second sets of affine functions may be performed on the two objects simultaneously.

Figure 4:
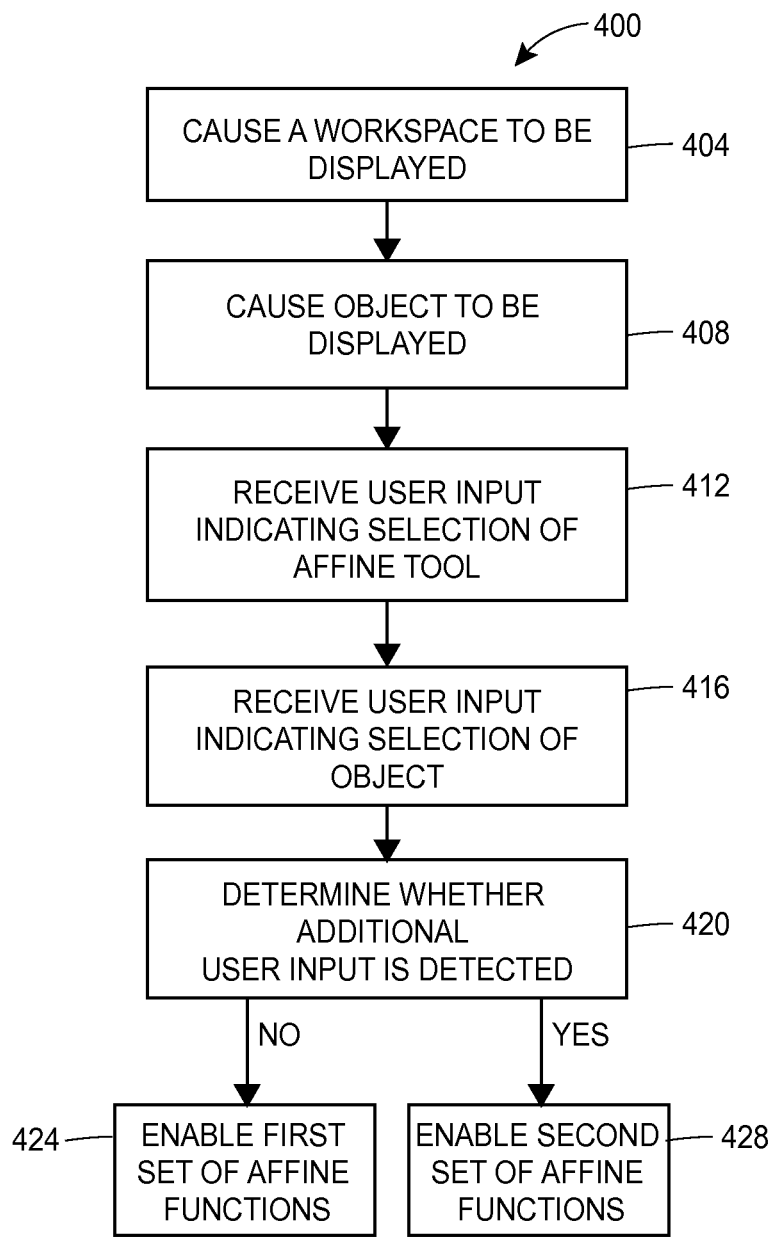
FIG. 4 is a flow diagram of an example method of facilitating the editing of an object in computer aided layout software.

FIG. 4 is a flow diagram of an example method 400 for facilitating the editing of an object in a CAD system. The method 400 may be implemented by a device such as the example computer system 100 of FIG. 1, and will be described with reference to FIG. 1 for illustrative purposes. The method 400, however, may be implemented by other suitable devices as well. Additionally, the method 400 may be implemented in conjunction with affine grips such as the affine grips of FIGS. 3A-C, and will be described with reference to FIGS. 3A-C for illustrative purposes. The method 400, however, may be utilized with other suitable user interface mechanisms as well.

At block 404, the workspace 300 is displayed on a suitable display device. For example, the one or more processors 104 may cause the workspace 300 to be displayed on the display device 112 of the computer system. At block 408, an object is displayed in the workspace. For example, the one or more processors 104 may cause the object 304 to be displayed in the workspace 300. The displayed object may be created within or imported into the workspace. At block 412, a user input is received via a suitable user input device, where the user input indicates the selection of an affine tool. For example, the one or more processors 104 may receive the user input via a user input device 114 (e.g., a mouse click when the cursor is over a toolbar button corresponding to the select tool. In response to this input, the CAD system enables the functionality of the affine tool 308. For example, the one or more processors 104 may enable the functionality of the affine tool 308.

At block 416, a user input indicating selection of the object is received. If block 416 occurs after block 412, the user may select the object using the affine tool. If block 416 occurs before block 412, the user may select the object using a select tool different than the affine tool, using a cursor, by touching a touch screen, etc. For example, the one or more processors 104 may receive the user input via a user input device such as the mouse 120.

At block 420, it is determined whether an additional user input is detected. In the absence of the additional user input at block 420, the CAD system provides user access to a first set of affine functions. On the other hand, when the additional user input is detected at block 420, the CAD system provides user access to a second set of affine functions. The one or more processors 104 may determine whether the additional user input is detected. When it is determined that the additional user input is not present, the first set of affine functions associated with the object are enabled at block 424. For example, the one or more processors 104 may enable the first set of affine functions. Enabling the first set of affine functions may include displaying a first set of grips on or associated with the object, such as the first set of affine grips 320, 324, 328.

On the other hand, if is determined at block 420 that the additional user input is present, the second set of affine functions associated with the object are enabled at block 428. For example, the one or more processors 104 may enable the second set of affine functions. Enabling the second set of affine functions may include displaying a second set of grips on or associated with the object, such as the second set of affine grips 332, 36.

The additional user input of block 420 may include depression of a particular key on a keyboard. The additional user input of block 420 may include other types of input as well, such as a depression of a button on a mouse (e.g., a "right" button press), selection of a menu item (e.g., from a pop-up menu), a voice command, a touch screen input (e.g., selection of a button, a menu item, etc.).

In an embodiment, the first set of affine functions is two or more functions and includes at least i) a move function to move the object in the workspace, and ii) a resize function to resize the object. The first set of affine functions may also include iii) a rotate function to rotate the object. The second set of affine functions is one or more functions and includes at least a skew function to skew the object. The method 400 provides access to multiple affine functions in a single tool. In contrast, if a user must select a new tool to get access to a different affine function for manipulating an object, the user is required to divert the cursor (if present) and user focus from the object and to a toolbar, for example. As discussed above, in the method 400, the multiple affine functions are grouped in first and second sets. By grouping the functions in this way, the number of grips displayed on or associated with the object at one time is reduced to prevent or mitigate visual overload. Additionally, more commonly used functions such as move, resize, rotate, etc., are provided in the first set, whereas less commonly used functions such as skew are provided in the second set. In other embodiments, numbers of functions in the first and second sets of affine functions may be different than discussed above, and the combinations of functions in the first and second of functions may be different than discussed above. Examples of affine functions such as move, resize, rotate, and skew are described below.

Figure 5:
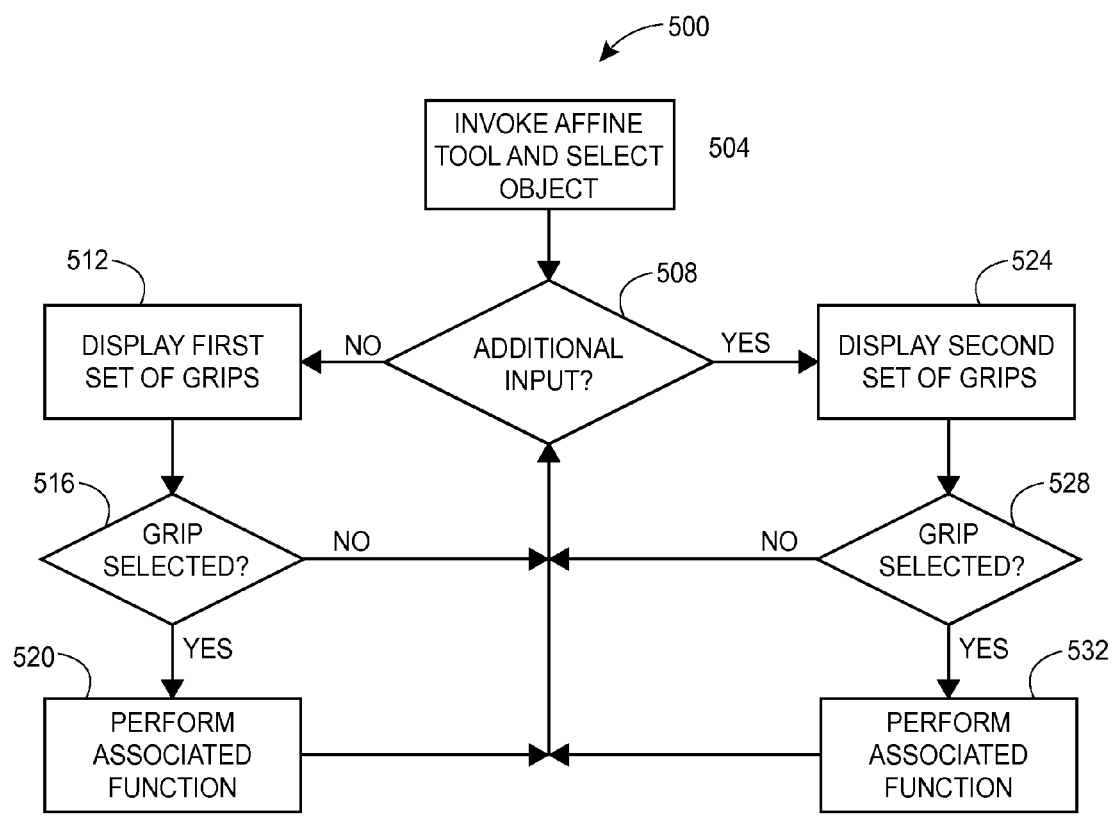
FIG. 5 is a flow diagram of an example method of providing a first set and a second set of grips in a CAD environment.

FIG. 5 is a flow diagram of an example method 500 for providing a plurality of affine functions to a user in one single tool. The method 500 may be implemented by a device such as the example computer system 100 of FIG. 1. The method 500, however, may be implemented by other suitable devices as well. Additionally, the method 500 may be implemented in conjunction with affine grips such as the example affine grips of FIGS. 3A-C, and will be described with reference to FIGS. 3A-C for illustrative purposes. The method 500, however, may be utilized with other suitable user interface mechanisms as well.

At block 504, the user selects the affine tool and selects an object on a workspace of a CAD system by providing appropriate inputs via one or more user input devices of a computer system. Block 504 may be implemented as discussed above with respect to FIG. 4, for example. The object may be selected before or after invoking the affine tool. Block 504 may include the one or more processors 104 detecting user inputs provided via the one or more user input devices 114.

At block 508, it is determined whether the user provided an additional input associated with a second set of affine functions. For example, the user may press a particular key on a keyboard, clicking a mouse button (e.g., a "right" button), selecting a button or menu item on a display, touching a touch screen, etc. Block 508 may include the one or more processors 104 detecting the additional input provided via the one or more user input devices 114.

If it is determined at block 508 that the user did not provide the additional input associated with the second set of affine functions, then a first set of affine grips are displayed at block 512. For example, the first set of affine grips 320, 324, 328 may be displayed. Block 512 may include the one or more processors 104 causing the first set of grips to be displayed on the display device 112.

At block 516, it is determined whether a particular affine grip from the first set of affine grips has been selected. If it is determined at block 516 that an affine grip from the first set of affine grips is not selected by the user, the flow returns to block 508. However, if it is determined at block 516 that an affine grip from the first set of affine grips is selected by the user, then the function associated with that particular affine grip is performed at block 520. Once the function has been performed at block 520, the flow returns to block 508. Block 516 may include the one or more processors 104 detecting whether the grip is selected via the one or more user input devices 114. Block 520 may include the one or more processors 104 causing the appropriate affine function to be performed on the object and to cause the modified object to be displayed on the display device 112.

On the other hand, if it is determined at block 508 that the user did provide the additional input associated with the second set of affine functions, the flow proceeds to block 524. At block 524, the second set of affine grips is displayed. For example, the second set of affine grips 332, 336 may be displayed. Block 524 may include the one or more processors 104 causing the second set of grips to be displayed on the display device 112.

At block 528, it is determined whether a particular affine grip from the second set of affine grips has been selected. If it is determined at block 528 that an affine grip from the second set of affine grips is not selected by the user, the flow returns to block 508. However, if it is determined at block 528 that an affine grip from the second set of affine grips is selected by the user, then the function associated with that particular affine grip is performed at block 532. Once the function has been performed at block 532, the flow returns to block 508. Block 528 may include the one or more processors 104 detecting whether the grip is selected via the one or more user input devices 114. Block 532 may include the one or more processors 104 causing the appropriate affine function to be performed on the object and to cause the modified object to be displayed on the display device 112.

In an embodiment, the first set of affine functions is two or more functions and includes at least i) a move function to move the object in the workspace, and ii) a resize function to resize the object. The first set of affine functions may also include iii) a rotate function to rotate the object. The second set of affine functions is one or more functions and includes at least a skew function to skew the object. The method 500 provides access to multiple affine functions in a single tool. In contrast, if a user must select a new tool to get access to a different affine function for manipulating an object, the user is required to divert the cursor (if present) and user focus from the object and to a toolbar, for example. As discussed above, in the method 500, the multiple affine functions are grouped in first and second sets. By grouping the functions in this way, the number of grips displayed on or associated with the object at one time is reduced to prevent or mitigate visual overload. Additionally, more commonly used functions such as move, resize, rotate, etc., are provided in the first set, whereas less commonly used functions such as skew are provided in the second set. In other embodiments, numbers of functions in the first and second sets of affine functions may be different than discussed above, and the combinations of functions in the first and second of functions may be different than discussed above.

Figure 6A:
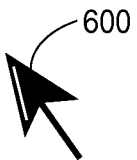
FIGS. 6A-6H are example icons that may be used to represent a cursor in a CAD environment.

FIGS. 6A-H are examples of icons that may be used to display a cursor when different tools and/or functions are selected and/or when different functions are invoked or available. For example, when a user enables the affine function tool, the cursor may be displayed as an arrow 600 as depicted in FIG. 6A. The arrow icon 600 may indicate to the user that the affine function tool has been enabled and that a user may now select an object on which to perform one or more affine functions. Additionally or alternatively, some other suitable graphical mechanism indicates to the user that the affine function tool has been enabled. For example, a toolbar button corresponding to the affine function tool may be highlighted.

Figure 6B:
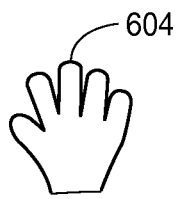

When the user moves the cursor into close proximity with one of the affine grips associated with a selected object, the cursor may be displayed as a hand 604 as depicted in FIG. 6B. The hand 604 may indicate to the user that one or more of a first set of affine function associated with one of the first set of grips may be performed by selecting a particular grip. When the additional user input that indicates the second set of affine functions is received, the appearance of the grips may be changed, some grips may be removed, additional grips may be added, etc., to indicate the second set of affine functions are available. Changing the appearance of a grip may include one or more of changing the shape, changing the color, causing the grip to blink or flash, highlighting the grip, shading the grip, etc.

Figure 6C:
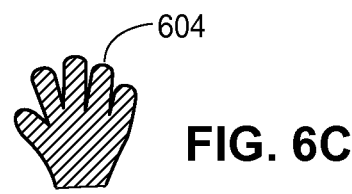
Figure 6D:
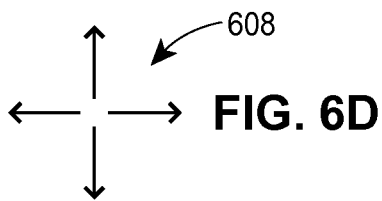

It will be appreciated by one of ordinary skill in the art that there are many ways of indicating that a particular functionality is available to a user. For example, the appearance of the cursor could change. For example, FIG. 6C shows that the hand icon 604 of FIG. 6B may be displayed in another color or another shade to indicate to the user that the first set of affine functions is no longer available and that second set of affine functions is now available. Alternatively, the cursor could begin to flash upon detection of the additional user input associated with the second set of functions, indicating to the user that the first set of affine functions is not longer available and that the second set of affine functions is now available. If the additional user input is a press of a particular key on a keyboard, upon release of the keyboard input, the cursor may return to its previous state as an arrow icon 600 or the hand icon 604 of FIGS. 6A and 6B, respectively.

Additionally or alternatively, the cursor may be displayed as an icon that indicates which specific affine function is associated with a specific affine grip. For example, when the user moves the cursor to a point on or near an object, the cursor may be displayed as the four arrows icon 608 shown in FIG. 6D. The four arrows icon 608 may serves as an indication to the user that the user may now move an object by clicking on and dragging the selected object to a desired location. Once the selected object has reached the desired location, the user may drop the selected object to complete the move function.

Figure 6E:
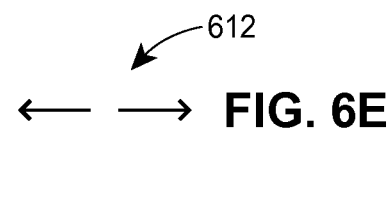

In another example, when the user moves the cursor over a grip corresponding to a resize function in a horizontal direction, the cursor may be displayed as the horizontal two arrows icon 612 shown in FIG. 6E. The horizontal two arrows icon 612 may serve as an indication to the user that the user may now resize the object by stretching the object along a horizontal axis by clicking on and dragging the selected grip to a desired location. Once the selected grip has reached the desired location, the user may drop the selected grip to complete the resize function.

Figure 6F:
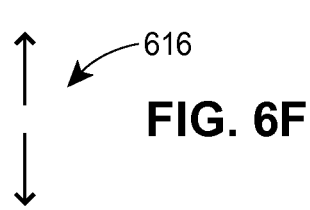

By contrast, when the user moves the cursor over a grip corresponding to a resize function in a vertical direction, the cursor may be displayed as the vertical two arrows icon 616 shown in FIG. 6F. The vertical two arrows icon 616 may serve as an indication to the user that the user may now resize the object by stretching the object along a vertical axis by clicking on and dragging the selected grip to a desired location. Once the selected grip has reached the desired location, the user may drop the selected grip to complete the resize function.

Figure 6G:
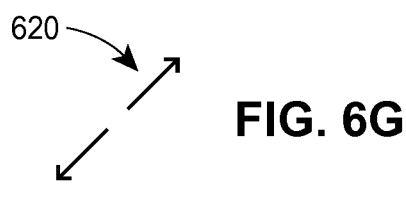

Moreover, when the user moves the cursor over a grip corresponding to a scale function, the cursor may be displayed as the angled two arrows icon 620 shown in FIG. 6G. The angled two arrows icon 620 serves as an indication to the user that the user may now resize the object by scaling the object by clicking on and dragging the selected grip to a desired location. Once the selected grip has reached the desired location, the user may drop the selected grip to complete the resize function, wherein a ratio between a width and a height of the object is maintained.

Figure 6H:
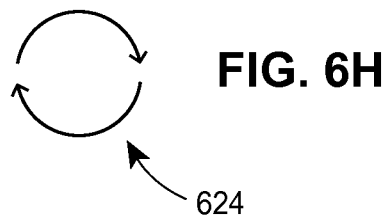

Further still, when the user moves the cursor over a grip associated with a rotate function, the cursor may be displayed as the circular two arrows icon 624 shown in FIG. 6H. The circular two arrows icon 624 may serve as an indication to the user that the user may now rotate the selected object by clicking on and dragging the selected grip to a desired location. Once the selected grip has reached the desired location, the user may drop the grip to complete the rotate function.

It will be appreciated by one of ordinary skill in the art that the cursor may take on any number of suitable icons to indicate to a user that a certain set of tools is available for manipulation of an object in a workspace. Changing the appearance of the cursor may include the one or more processors 104 causing a different icon to be displayed on the display device 112.

The first and second set of affine grips may be displayed in any number of suitable ways to aid the user in his or her editing of an object. For example, the grips may be drawn in a relatively light color or with light shading when the cursor is not in close proximity to one of the grips. As the cursor approaches one of the grips, the particular grip may be displayed in a relatively darker color or with darker shading, for example. This will draw the user's attention to the grip when it is becoming relevant to the position of the cursor. As another example, the grips may be displayed as relatively small when the cursor is not in close proximity to one of the grips. As the cursor approaches one of the grips, the particular grip may be displayed as relatively larger to draw the attention of the user to the grip when it is becoming relevant to the position of the cursor. Similarly, when a particular grip is selected, the other now irrelevant grips associated with the object may be hidden, reduced in size, "greyed," displayed with transparency, etc. Furthermore, if a selected object is so relatively small within the workspace that certain grips begin to compete with one another for click target real estate, the less frequently used grips may be hidden or deactivated to preserve space on the object for the more frequently used grips. The hidden grips may then be displayed should the user choose to zoom in on an object and/or the workspace.

Figures 7A, 7B:
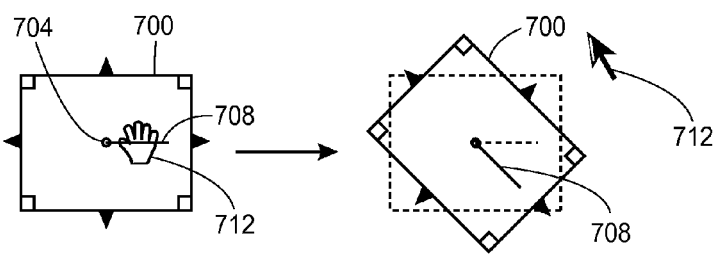
FIG. 7A-7B shows the rotate function using the rotate grip.

FIGS. 7A-12B illustrate example processes for invoking and performing the affine functions associated with the first and second sets of affine grips. FIGS. 7A-B demonstrate invoking and performing a rotate function on an object 700. The rotate function allows a user to change the orientation of the object 700 within the workspace around a point of rotation. In the example of FIGS. 7A-B, the rotate function is performed around a point 704. As discussed previously, a first set of affine grips are displayed on or associated with the selected object when the object has been selected and an additional user input associated with the second set of affine functions is not detected. In the example of FIGS. 7A-B, the rotate function is included in the first set of affine functions, and a rotate grip 708 is displayed. Initially, a cursor 712 is displayed with the arrow icon 600 as discussed above with respect to FIG. 6A. When the user moves the cursor 712 in close proximity to the rotate grip 708, the cursor 712 may be displayed as the hand icon as shown in FIG. 7A, and as discussed above with respect to FIG. 6B. Alternatively, the cursor 712 may be displayed as the circular two arrows icon 624 described with respect to FIG. 6H. Such a change in the display of the cursor 712 may alert the user that the rotate function associated with the rotate grip 708 is now available. The user may then select the rotate grip 708 by clicking on the mouse or otherwise selecting with a suitable user input device.

The user performs the rotate function by dragging the rotate grip 712 to a desired location and then dropping or de-selecting the rotate grip 712, as shown in FIG. 7B. Once the cursor 712 has moved away from the rotate grip 708, it may be displayed again as an arrow icon, indicating that the rotate function is complete. The object 700 remains in its rotated orientation.

Figure 8A:
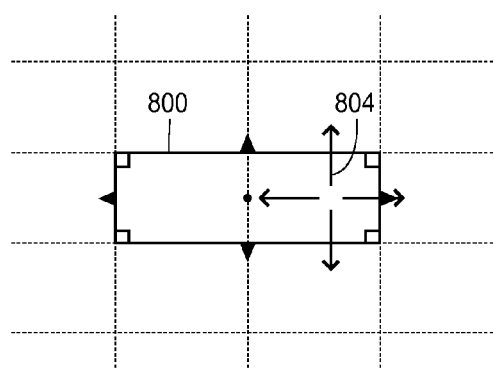
FIG. 8A-8B shows the move function using the move grip.
Figure 8B:
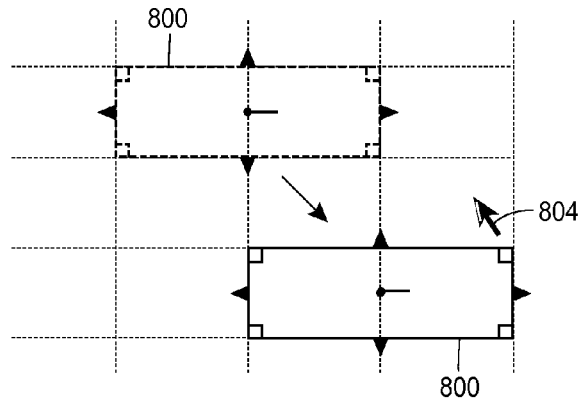

FIG. 8A-B demonstrates invoking and performing the move function on an object 800. The move function allows a user to relocate an object from one part of the workspace to another without requiring the user to delete the object and redraw it at a desired location. As discussed above with respect to FIG. 3B, the selected object 800 displays a first set of affine grips when the object 800 has been selected and an additional user input associated with the second set of affine functions is not detected. To move the object, a user may move a cursor 804 onto the object but not on one of the grips from the first set of grips. The cursor 804 may be displayed as the four arrow icon 608, as discussed above with respect to FIG. 6D. The change in the display of the cursor 804 alerts the user that the move function is now available. The user may then move the object by selecting the object such as by clicking on the mouse or using some other suitable user input device.

The user performs the move function by dragging the object 800 to a desired location and then dropping the object 800, as shown in FIG. 8B. Once the cursor 804 has moved away from the object 800, the cursor 804 may be displayed again as an arrow icon. The object 800 remains at its new location.

Figures 9A, 9B:
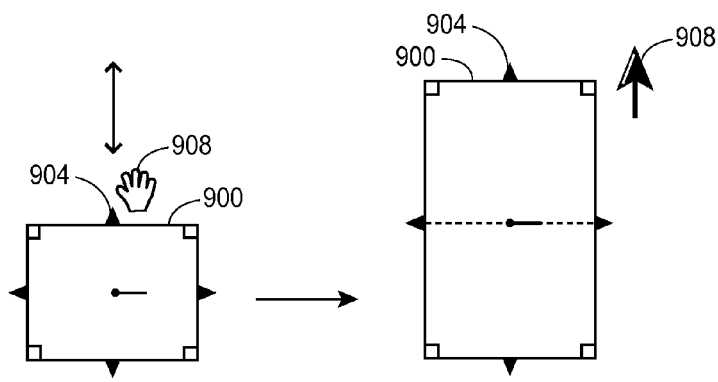
FIG. 9A-9B shows the stretch function using the stretch grip.

FIG. 9A-B demonstrates invoking and performing a resize function in which an object 900 is stretched along a vertical axis. As shown in FIG. 9A and discussed above with respect to FIG. 3B, the selected object 900 displays a first set of affine grips when the object 900 has been selected and an additional user input associated with the second set of affine functions is not detected. A stretch grip 904 is associated with a stretch function. Initially, a cursor 908 is displayed with the arrow icon 600 as discussed above with respect to FIG. 6A. When the user moves the cursor 908 in close proximity to the stretch grip 904, the cursor 908 may be displayed as the hand icon 604, as discussed above with respect to FIG. 6B. Alternatively, the cursor 908 may be displayed as the vertical two arrows icon 616 described in FIG. 6F. Such a change in the display of the cursor 904 may indicate to the user that the stretch function associated with the stretch grip 904 is now available. The user may then select the stretch grip 904 by clicking on the mouse.

The user performs the stretch function by dragging the stretch grip 904 to a desired location and then dropping the stretch grip 904, as shown in FIG. 9B. Once the cursor 908 has moved away from the stretch grip 904, it may be displayed again as an arrow icon 600, indicating that the stretch function is complete. The object 900 remains in its stretched configuration.

FIG. 10A-B demonstrates invoking and performing a resize function in which an object 1000 is scaled. The scale function allows the user to change the size of an object 1000 without requiring the user to erase the object 1000 and redraw the object 1000 at a different size. As demonstrated in FIG. 10A and discussed above with respect to FIG. 3B, the selected object 1000 displays a first set of affine grips when the object 1000 has been selected and an additional user input associated with the second set of affine functions is not detected. A scale grip 1004 is associated with a scale function. Initially, a cursor 1008 is displayed with the arrow icon 600 as discussed above with respect to FIG. 6A. When the user moves the cursor 1008 in close proximity to the scale grip 1004, the cursor 1008 may be displayed as the hand icon 604, as discussed above with respect to FIG. 6B. Alternatively, the cursor 1008 may be displayed as the angled two arrows icon 620 described in FIG. 6G. Such a change in the display of the icon 1008 alerts the user that the scale function associated with the scale grip 1004 is now available.

The user may then select the scale grip 1004 by clicking on the mouse or using another suitable user input device. The user performs the scale function by dragging the scale grip 1004 until the object 1000 has reached its desired size, then dropping the scale grip 1004, as shown in FIG. 10B. Once the cursor 1008 has moved away from the scale grip 1004, the cursor 1008 may be displayed again as an arrow icon 600, indicating that the scale function is complete. The object 1000 remains at its newly scaled size.

The stretch and scale functions described above with respect to FIGS. 9A-10B are examples of a more general "resize" Function.

FIGS. 11A-B demonstrate invoking and performing a skew function on an object 1100. The skew function allows a user to move a line segment 1104 associated with a skew grip 1108 in a number of directions along any axis while the adjacent line segments 1112 and 1116 adapt to maintain the integrity of the borders of the object 1100 and the non-adjacent line segment 1120 of the object 1100 remains stationary. As demonstrated in FIG. 11A and discussed above with respect to FIG. 4C, the selected object 1000 displays a second set of affine grips when the object 1000 has been selected and an additional user input associated with the second set of affine functions is detected. When the user moves a cursor 1124 in close proximity to the skew grip 1108, the cursor 1124 may be displayed as the hand icon 604, as discussed above with respect to FIG. 6B. Alternatively, the cursor 1124 may be displayed as the shaded hand icon 604, as discussed above with respect to FIG. 6C, or the four arrows icon 608, as discussed above with respect to FIG. 6D. Still further, the cursor 1124 may be displayed as a flashing icon or any number of other suitable forms. This change in appearance of the icon 1124 may alert the user that the skew function associated with the skew grip 1108 is now available.

The user may then select the skew grip 1108 by clicking on the mouse or using another suitable user input device. The user performs the skew function by dragging the skew grip 1108 to a desired location and then dropping the skew grip 1108, as shown in FIG. 11B. Once the cursor 1124 has moved away from the skew grip 1108, the cursor 1124 may be displayed again as an arrow icon 600, indicating that the skew function is complete. The object 1100 remains in its skewed configuration.

In other embodiments, the skew function may be limited to movement along a single axis.

FIG. 12A-B demonstrates invoking and performing a move vertex function on an object 1200. The move vertex function allows a user to move a vertex 1204 of two line segments 1208 and 1212 associated with a move vertex grip 1216 in a number of directions along any axis while the intersecting line segments 1208 and 1212 adapt to maintain the integrity of the borders of the object 1200 and non-adjacent line segments 1220 and 1224 of the object 1200 remain stationary. As discussed above with respect to FIG. 4C, the selected object 1200 displays a second set of affine grips when the object 1200 has been selected and an additional user input associated with the second set of affine functions is detected. Thus, in an embodiment, the move vertex function is included in the second set of affine functions. In other embodiments, the second set of affine functions does not include the move vertex function. When the user moves a cursor 1230 in close proximity to the move vertex grip 1216, the cursor 1230 may be displayed as the hand icon 604, as discussed above with respect to FIG. 6B. Alternatively, the cursor 1230 may be displayed as the shaded hand icon 604, as discussed above with respect to FIG. 6C, or the four arrows icon 608, as discussed above with respect to FIG. 6D. Still further, the cursor 1230 may be displayed a flashing icon or any number of other suitable forms. Such a change in appearance of the icon may alert the user that the move vertex function associated with the move vertex grip 1216 is now available.

The user may then select the move vertex grip 1216 by clicking on the mouse. The user performs the move vertex function by dragging the vertex 1204 to a desired location and then dropping the vertex 1204, as shown in FIG. 12B. Once the cursor 1230 has moved away from the move vertex grip 1216, the cursor 1230 may be displayed again as an arrow icon 600, indicating that the move vertex function is complete. The vertex 1204 remains at its designated location, and the object 1200 remains in its new configuration.

As discussed above, the affine functions may be grouped into the first set of affine functions and the second set of affine functions in any number of suitable schemes. It may be advantageous to place the more commonly-used affine functions together in the first set of affine functions. For example, if the most commonly-used affine functions are move, stretch, scale, and rotate, it may be advantageous to include those functions in the first set of affine functions and include other, less commonly-used functions in the second set of affine functions. Alternatively, it may be advantageous to group intuitively related affine functions together in the same toolset. For example, skew line segment and move vertex may be deemed to be related affine functions, as members of the broader concept "skew," since both tools allow a user to modify an object so that angles of vertices are changed. Thus, it may be desired to include those two functions in the same set of affine functions because they are intuitively related. Still further, it may be advantageous to allow the user to configure the CAD system so that the user determines which affine functions are associated with which sets, and/or which types of grips and/or which grips are displayed in related sets. For example, a user could choose to include the move, skew, and scale functions in the first set of affine functions and to include the rotate and stretch, and move vertex functions in the second set of affine functions. In some embodiments, the move vertex function is not included in the first set of affine functions or the second set of affine functions.

At least some of the various blocks, operations, and techniques described above may be implemented in hardware, a processor executing firmware and/or software instructions, or any combination thereof. When implemented utilizing a processor executing software or firmware instructions, the software or firmware instructions may be stored in any computer readable memory such as on a magnetic disk, an optical disk, or other tangible storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable, tangible computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions stored on a memory or other computer-readable storage medium that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method of facilitating the editing of an object in a computer aided design system, the method comprising:
    causing a workspace to be displayed on a display device;
    causing an object to be displayed in the workspace;
    receiving a user input indicating selection of an affine tool;
    receiving a user input indicating selection of the object;
    determining whether an additional user input is received, wherein the additional user input is associated with affine functionality;
    in response to i) the user input indicating a selection of the affine tool, ii) the user input indicating a selection of the object, and iii) a determination that the additional user input is not received, enabling a first set of user-activatable affine functions for manipulating the object, wherein enabling the first set of user-activatable affine functions includes causing a first set of grips to be displayed on the display device in association with the object, wherein the first set of grips includes a first grip associated with a first affine function and a second grip associated with a second affine function different from the first affine function, and wherein the first grip associated with the first affine function and the second grip associated with the second affine function are displayed together on the display device; and in response to i) the user input indicating a selection of the affine tool, ii) the user input indicating a selection of the object, and iii) a determination that the additional user input is received, ceasing to display the first set of grips and enabling a second set of one or more user-activatable affine functions for manipulating the object, wherein enabling the second set of one or more user-activatable affine functions includes causing a second set of grips to be displayed on the display device in association with the object, wherein the second set of grips includes a third grip associated with a third affine function, and wherein the third affine function is different from the first and second affine functions.

2. The method of according to claim 1, wherein the first affine function is a move function, the second affine function is a resize function, and the third affine function is a skew function.

3. The method according to claim 1, wherein the first set of user-activatable affine functions includes a rotate function.

4. The method of according to claim 3, wherein the first affine function is a resize function, the second affine function is a rotate function, and the third affine function is a skew function.

5. The method of according to claim 4, further comprising: causing a display of a cursor to change when the cursor is placed over one of the grips in the first set of grips.

6. The method of according to claim 5, further comprising: causing the display of the cursor to change when the cursor is placed over one of the grips in the second set of grips.

7. The method of according to claim 1, further comprising: causing an appearance of a cursor to change when a position of the cursor indicates that an affine function from the first set of affine functions can be activated by the user.

8. The method of according to claim 1, further comprising:
displaying a cursor to indicate the first set of user-activatable affine functions are enabled when the first set of user-activatable affine functions are enabled; and
displaying the cursor to indicate the second set of user-activatable affine functions are enabled when the second set of user-activatable affine functions are enabled.

9. The method of according to claim 1, wherein the additional user input is a press of a particular key on a keyboard.

10. One or more computer readable memories having computer executable instructions stored thereon that, when executed by one or more processors, cause the one or more processors to:
cause a workspace to be displayed on a display device;
cause an object to be displayed in the workspace;
receive a user input indicating selection of an affine tool;
receive a user input indicating selection of the object;
determine whether an additional user input is received, wherein the additional user input is associated with affine functionality;
in response to i) the user input indicating a selection of the affine tool, ii) the user input indicating selection of the object, and iii) a determination that the additional user input is not received, enable a first set of user-activatable affine functions for manipulating the object such that a first set of grips are displayed on the display device in association with the object, wherein the first set of grips includes a first grip associated with a first affine function and a second grip associated with a second affine function different from the first affine function, and wherein the first grip associated with the first affine function and the second grip associated with the second affine function are displayed together on the display device; and in response to i) the user input indicating a selection of the affine tool, ii) the user input indicating a selection of the object, and iii) a determination that the additional user input is received, cease to display the first set of grips and enable a second set of one or more user-activatable affine functions for manipulating the object such that a second set of grips are displayed on the display device in association with the object, wherein the second set of grips includes a third grip associated with a third affine function, and wherein the third affine function is different from the first and second affine functions.

11. One or more computer readable memories according to claim 10, wherein the first affine function is a move function, the second affine function is a resize function, and the third affine function is a skew function.

12. One or more computer readable memories according to claim 10, wherein the first set of user-activatable affine functions includes a rotate function.

13. One or more computer readable memories according to claim 12, wherein the first affine function is a resize function, the second affine function is a rotate function and the third affine function is a skew function.

14. One or more computer readable memories according to claim 13, having computer executable instructions stored thereon that, when executed by one or more processors, cause the one or more processors to:
cause a display of a cursor to change when the cursor is placed over one of the grips in the first set of grips.

15. One or more computer readable memories according to claim 10, having computer executable instructions stored thereon that, when executed by one or more processors, further cause the one or more processors to:
cause an appearance of a cursor to change when an affine function from the first set of affine functions can be activated by the user.

16. One or more computer readable memories according to claim 10, having computer executable instructions stored thereon that, when executed by one or more processors, further cause the one or more processors to:
display a cursor to indicate the first set of user-activatable affine functions are enabled when the first set of user-activatable affine functions are enabled; and
display the cursor to indicate the second set of user-activatable affine functions are enabled when the second set of user-activatable affine functions are enabled.

17. One or more computer readable memories according to claim 10, wherein the additional user input is a press of a particular key on a keyboard.

18. A computer-aided design system, comprising:
one or more processors;
a display device;
one or more user input devices;
one or more memory devices to store computer readable instructions that, when executed by the one or more processors, cause the one or more processors to:
cause a workspace to be displayed on a display device;
cause an object to be displayed in the workspace;
receive, via the one or more user input devices, a user input indicating selection of an affine tool;
receive, via the one or more user input devices, a user input indicating selection of the object;

determine whether an additional user input is received, wherein the additional user input is associated with affine functionality;

in response to i) the user input indicating a selection of the affine tool, ii) the user input indicating a selection of the object, and iii) a determination that the additional user input is not received, enable a first set of user-activatable affine functions for manipulating the object such that a first set of grips are displayed on the display device in association with the object, wherein the first set of grips includes a first grip associated with a first affine function and a second grip associated with a second affine function different from the first affine function, and wherein the first grip associated with the first affine function and the second grip associated with the second affine function are displayed together on the display device; and in response to i) the user input indicating a selection of the affine tool, ii) the user input indicating a selection of the object, and iii) a determination that the additional user input is received, cease to display the first set of grips and enable a second set of one or more user-activatable affine functions for manipulating the object such that a second set of grips are displayed on the display device in association with the object, wherein the second set of grips includes a third grip associated with a third affine function, and wherein the third affine function is different from the first and second affine functions.

19. The system according to claim 18, wherein the first affine function is a move function, the second affine function is a resize function, and the third affine function is a skew function.

20. A method of facilitating the editing of an object in a computer aided design system, the method comprising:

receiving user input indicating selection of a transformation tool;

receiving user input indicating selection of an object;

enabling a first set of transformation functions for manipulating the object, wherein enabling the first set of transformation functions includes causing a first set of grips to be displayed on the display device in association with the object, wherein the first set of grips includes a first grip associated with a first transformation function and a second grip associated with a second transformation function different from the first transformation function, and wherein the first grip associated with the first transformation function and the second grip associated with the second transformation function are displayed together on the display device; and in response to determining that additional user input is received, ceasing to display the first set of grips and enabling a second set of transformation functions for manipulating the object, wherein enabling the second set of transformation functions includes causing a second set of grips to be displayed on the display device in association with the object, wherein the second set of grips includes a third grip associated with a third transformation function, and wherein the third transformation function is different from the first and second transformation functions.

21. The method of according to claim 1, further comprising:

in response to i) the user input indicating a selection of the affine tool, ii) the user input indicating a selection of the object, and iii) a determination that the additional user input is not received, ceasing to display the second set of grips and displaying the first set of grips.

* * * * *